S. J. MOORE.
AUTOMOBILE TIRE.
APPLICATION FILED SEPT. 8, 1908.
991,737.
Patented May 9, 1911.
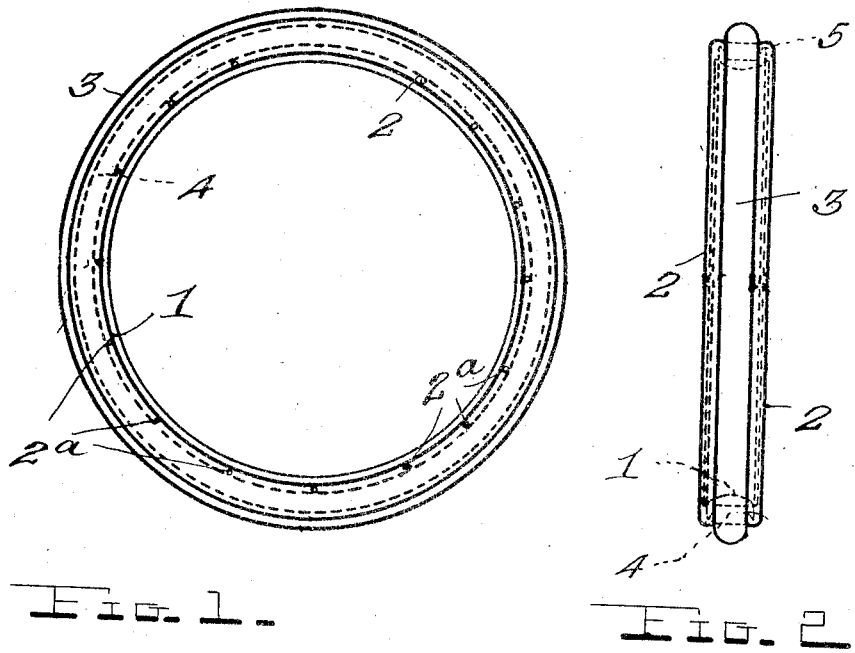
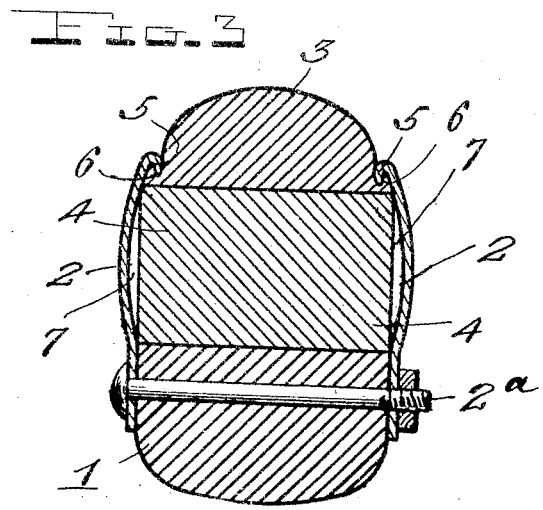
WITNESSES:
C. F. Limbach
Gertrude Laut.
INVENTOR
S. J. Moore

UNITED STATES PATENT OFFICE.

SAMUEL J. MOORE, OF NEW BREMEN, OHIO, ASSIGNOR OF TWO-THIRDS TO THEODORE KOOP AND OTTO J. BOESEL, OF NEW BREMEN, OHIO.

AUTOMOBILE-TIRE.

991,737.      Specification of Letters Patent.      Patented May 9, 1911.

Application filed September 8, 1908. Serial No. 452,128.

*To all whom it may concern:*

Be it known that I, SAMUEL J. MOORE, a citizen of the United States, residing at New Bremen, in the county of Auglaize and State of Ohio, have invented a new Automobile-Tire, of which the following is a specification.

My invention relates to improvements in cushion tires for automobile wheels and the like.

The object of the invention is to provide a simple and practical tire of this character which will take the place of a pneumatic tire and not be subject to punctures or blow-outs, and which will be inexpensive to produce and maintain, the parts being so constructed that they may be readily replaced when worn or damaged.

With the above and other objects in view the invention consists of the novel construction, combination and arrangement of parts hereinafter fully described and claimed and illustrated in the accompanying drawings in which—

Figures 1 and 2 are side and edge views respectively of my improved tire and Fig. 3 is an enlarged cross section through the same.

Referring more particularly to the drawings 1 denotes the felly of an automobile wheel, or a wheel of any form and construction to which my improved tire may be applied. The tire comprises in addition to the felly 1 two side plates 2, an outer tread member 3 and an inner cushioning member 4. The side plates 2 which are preferably made of pressed steel, aluminum or other suitable metal, are annular in form and have their inner portions secured by bolts 2ᵃ to the opposite side faces of the felly 1. The outer edges of the plates 2 engage the tread member 3 and to retain the latter between them said edges are inturned to form annular flanges 5 which engage grooved flanges 6 at the side edges of the member 3. The latter is preferably made of hard rubber to provide a durable yet yieldable tread surface, while the inner member 4 is made from soft rubber to give the tire the desired elasticity or resiliency and thereby make it an effective substitute for a pneumatic tire. The resiliency of the tire may be varied by varying the thickness of the inner member 4 and also by providing on the inner faces of the side plates 2 spaces 7 within which the member 4 can expand. Such spaces 7 are preferably formed by bulging outwardly the intermediate portions of the side plates 2, as clearly shown in Fig. 3.

From the foregoing it will be seen that when the tire is in use the soft rubber inner member 4 will take up all shocks and jars incident to the travel of the wheel over a rough road and effectively prevent them from being imparted to the automobile or other vehicle. By arranging the member 4 between the side plates 2 it will be effectively protected and the disposition of the hard rubber tread member 3 around the cushioning member will prevent wear upon the latter. When the tread member 3 is worn out it may be replaced at a small cost, as can also the other parts of the tire should they be damaged.

It will be noted that my improved tire will provide an effective substitute for a pneumatic tire and will not be subject to punctures or blow-outs.

Having thus described the invention what I claim is:

The herein described vehicle wheel tire comprising a felly having flat side faces, an inner annular cushioning member of soft rubber arranged on the periphery of the felly, said member being of rectangular shape in cross section and of the same width as the felly, an outer annular tread member of hard rubber, said tread member being of substantially semicircular shape in cross section and having its flat inner face extending across and in contact with the outer face of the inner cushioning member, said tread member being formed at its side edges with the outwardly projecting flanges 6 having annular grooves in their upper faces, and side plates of annular form extending around the felly and having their inner portions secured to the flat faces of the latter, the outer edges of said side plates being bent inwardly and downwardly to form the hook-shaped flanges 5 which enter the grooves in the flanges 6 of the tread member, the intermediate portions of said side plates being bulged outwardly and having their concave inner faces disposed opposite the flat side edges of the inner cushioning member, whereby spaces are formed within which said cushioning member may expand.

S. J. MOORE.

Witnesses:
C. F. LIMBACH,
GERTRUDE LAUT.